(12) United States Patent
Takizawa et al.

(10) Patent No.: US 8,872,891 B2
(45) Date of Patent: Oct. 28, 2014

(54) STORAGE MEDIUM, INFORMATION PROCESSING APPARATUS, INFORMATION PROCESSING METHOD AND INFORMATION PROCESSING SYSTEM

(75) Inventors: Satoru Takizawa, Kyoto (JP); Shingo Watanabe, Shibuya-ku (JP); Nagako Ikuta, Kyoto (JP); Tomohiro Yamamura, Kyoto (JP); Tomomi Sano, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 642 days.

(21) Appl. No.: 13/213,651

(22) Filed: Aug. 19, 2011

(65) Prior Publication Data

US 2012/0262447 A1    Oct. 18, 2012

(30) Foreign Application Priority Data

Apr. 13, 2011    (JP) ................. 2011-089233

(51) Int. Cl.
  *H04N 13/00*  (2006.01)
  *G06T 19/00*  (2011.01)
  *G06T 15/50*  (2011.01)
(52) U.S. Cl.
  CPC ........... *G06T 15/503* (2013.01); *G06T 2210/62* (2013.01); *G06T 19/00* (2013.01)
  USPC ........................................................ 348/42
(58) Field of Classification Search
  CPC ......... G06T 19/00; G06T 15/00; G06T 17/00; H04N 13/00; H04N 13/0018; H04N 13/0275
  See application file for complete search history.

(56) References Cited

U.S. PATENT DOCUMENTS 6,296,570 B1    10/2001  Miyamoto et al.
7,833,100 B2 *  11/2010  Dohta ............................. 463/38

FOREIGN PATENT DOCUMENTS

JP        10-295935        11/1998

* cited by examiner

*Primary Examiner* — Huy T Nguyen
(74) *Attorney, Agent, or Firm* — Nixon & Vanderhye PC

(57) ABSTRACT

A computer-readable storage medium having stored therein an information processing program to be executed by a computer is provided. The information processing program causes the computer to function as: preferential display object placing means for placing a preferential display object in an imaging range of a virtual stereo camera in a virtual three-dimensional space; stereoscopically visible image rendering means for taking the virtual three-dimensional space using the virtual stereo camera, and rendering a stereoscopically visible image of the virtual three-dimensional space; and display control means for causing the display apparatus to display the stereoscopically visible image rendered by the stereoscopically visible image rendering means. The stereoscopically visible image rendering means renders the preferential display object in preference to a predetermined object in front of the preferential display object, such that a portion of the preferential display object being overlapped by the predetermined object is translucent.

9 Claims, 11 Drawing Sheets

STORAGE MEDIUM, INFORMATION PROCESSING APPARATUS, INFORMATION PROCESSING METHOD AND INFORMATION PROCESSING SYSTEM

CROSS REFERENCE TO RELATED APPLICATION

The disclosure of Japanese Patent Application No. 2011-089233 filed on Apr. 13, 2011 is incorporated herein by reference.

BACKGROUND OF THE INVENTION

1. Field of the Invention

The present invention relates to a storage medium, an information processing apparatus, an information processing method and an information processing system, and more particularly, to those for realizing stereoscopically visible image display.

2. Description of the Background Art

Conventionally, there has been proposed a shooting game progressed in a virtual three-dimensional space, in which a shooting aim to be an index for attacking (shooting) an enemy plane is displayed on a display screen (refer to Japanese Laid-Open Patent Publication No. 10-295935, for example). This shooting aim is rendered on a two-dimensional plane in which the virtual three-dimensional space is rendered, and is moved up, down, and side to side according to a user input while it is constantly displayed on the display screen.

When performing stereoscopically visible image display using the above-described conventional technique, an aim object is rendered in the two-dimensional plane in which the virtual three-dimensional space is rendered. Therefore, the aim object is visually recognized by a user as if it is present in front of all other objects, resulting in an extremely unnatural stereoscopically visible image.

In order to avoid this problem, the virtual three-dimensional space may be rendered (imaged) with the aim object being placed in the virtual three-dimensional space as well as the other objects. In this case, the aim object is visually recognized to be present forward (in a depth direction), resulting in a natural stereoscopically visible image. However, if another object is present in front of the aim object, the aim object is hidden behind the other object, and thus the aim object loses its function as a shooting aim.

SUMMARY OF THE INVENTION

Therefore, an object of the present invention is to provide a recording medium or the like having stored therein an information processing program by which an indication object (typically, an aim object) for indicating a position in a virtual three-dimensional space can be naturally and stereoscopically displayed with a sense of depth, without losing its indicating function, when the virtual three-dimensional space is stereoscopically displayed.

The present invention has the following features to attain the object mentioned above.

A computer-readable storage medium is provided, which has stored therein an information processing program to be executed by a computer of an information processing apparatus which displays a stereoscopically visible image of a virtual three-dimensional space taken by a virtual stereo camera, on a display apparatus capable of displaying a stereoscopically visible image. The information processing program further causes the computer to function as preferential display object placing means, stereoscopically visible image rendering means, and display control means. The preferential display object placing means places a preferential display object in an imaging range of the virtual stereo camera in the virtual three-dimensional space. The stereoscopically visible image rendering means takes the virtual three-dimensional space using the virtual stereo camera, and renders a stereoscopically visible image of the virtual three-dimensional space. The display control means causes the display apparatus to display the stereoscopically visible image rendered by the stereoscopically visible image rendering means. The stereoscopically visible image rendering means renders the preferential display object in preference to an object in front of the preferential display object, such that a portion of the preferential display object being overlapped by the object in front is translucent.

With this configuration, the preferential display object is rendered in preference to the object in front of the preferential display object such that a portion of the preferential object being overlapped by the object in front is translucent. Thereby, the preferential display object can be displayed at a deeper position by a parallax and constantly displayed, and in addition, the preferential display object can be viewed in a natural manner.

The stereoscopically visible image rendering means renders the preferential display object according to a preference order by which the predetermined object in front of the preferential display object is preferentially rendered, and renders the preferential display object according to a preference order by which the preferential display object is preferentially rendered translucent. Particularly, the preferential display object may include a first object and a second object which is identical with the first object and translucent. The first object may be rendered according to the preference order by which the predetermined object in front of the preferential object is preferentially rendered, and the second object may be rendered according to the preference order by which the preferential display object is preferentially rendered. The preference order can be set by, for example, a method using a Z buffer. First, the preferential display object may be rendered using the ordinary Z test, and then the preferential display object which is translucent may be rendered in a situation where a result of a Z test is opposite to that of the ordinary Z test.

With this configuration, without determining whether at least a portion of the preferential object is overlapped by the predetermined object in front of the preferential display object, the portion of the preferential object being overlapped by the predetermined object in front can be displayed translucent by the rendering process using the Z-buffer algorithm.

The information processing program may further cause the computer to function as input receiving means for receiving an input from a user, and the preferential display object placing means may cause the preferential display object placed in the virtual three-dimensional space to move based on the input received by the input receiving means.

With this configuration, the user can operate the preferential display object to move.

The user object placing means may further cause the user object to move based on the input received by the input receiving means.

With this configuration, the user can operate the user object to move.

The preferential display object may be an indication object for indicating a position in the virtual three-dimensional space.

With this configuration, the user can recognize a position including a depth position in the virtual three-dimensional space, which is indicated by the indication object.

In the above description, the present invention is configured as a recording medium. However, the present invention may be configured as an information processing apparatus, an information processing method, or an information processing system.

According to the present invention, it is possible to provide a recording medium and the like having stored therein an information processing program by which an indication object (typically, an aim object) indicating a position in a virtual three-dimensional space can be naturally and stereoscopically displayed with a sense of depth, without losing its indicating function, when the virtual three-dimensional space is stereoscopically displayed.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiment

Hereinafter, a game apparatus as an information processing apparatus according to one embodiment of the present invention will be described. The present invention is not limited to such an apparatus. An information processing program to be executed in such an apparatus and an information processing system relating to such an apparatus are also within the scope of the present invention. Further, an information processing method performed by such an apparatus is also within the scope of the present invention.

(External Configuration of Game Apparatus)

Figure 1:
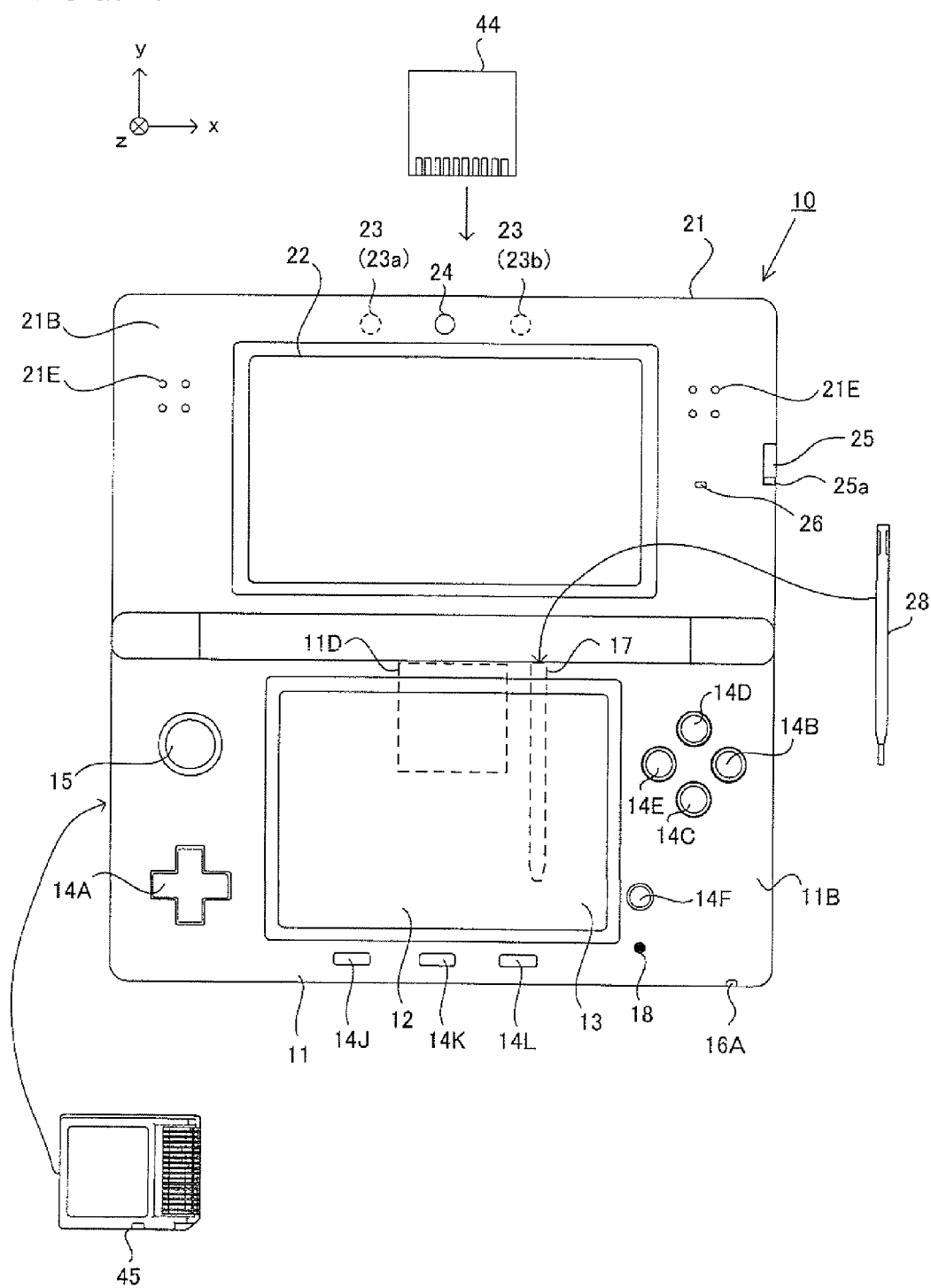
FIG. 1 is a front view of a game apparatus 10 in the opened state.
Figure 2:
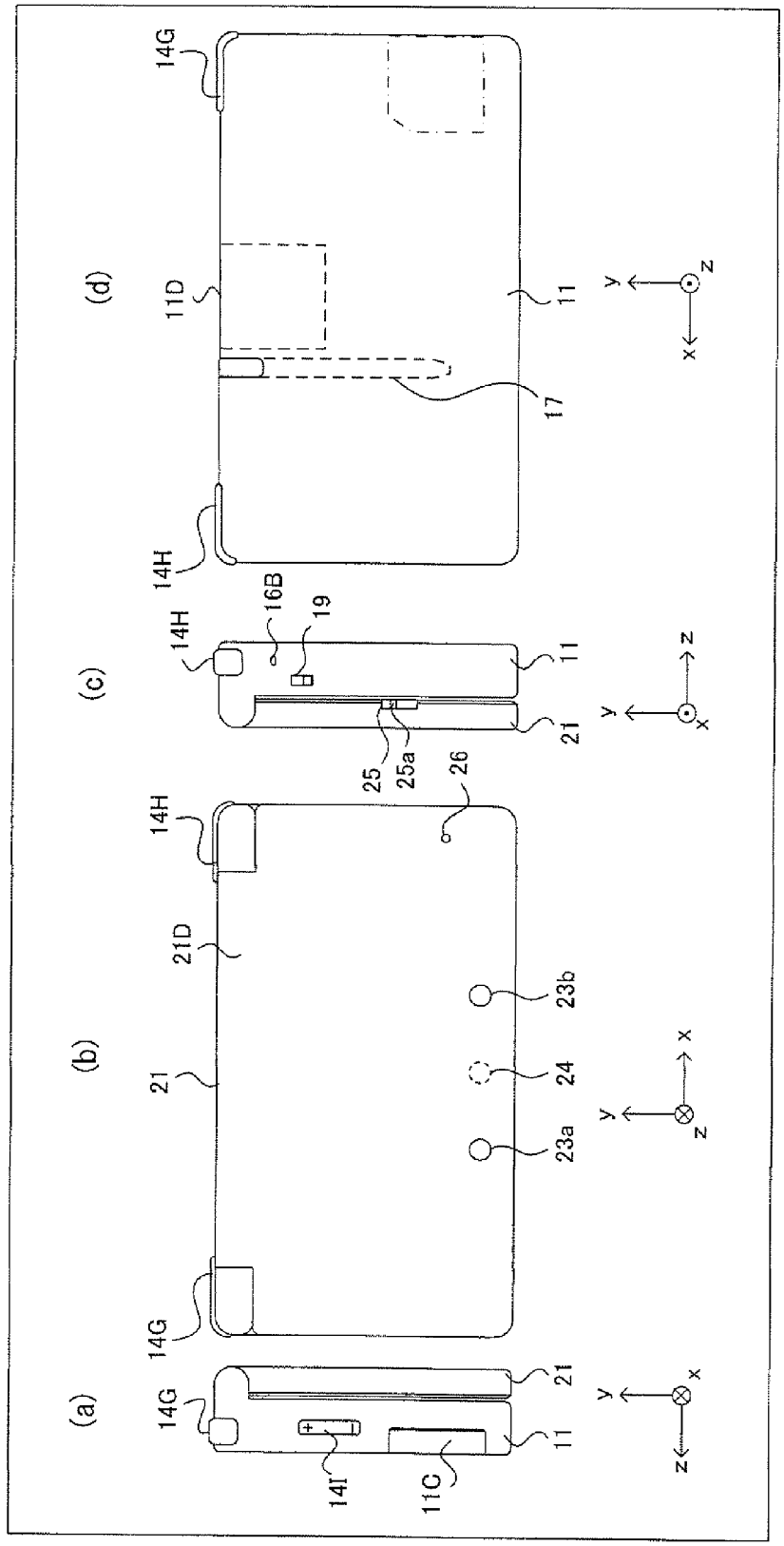
FIG. 2 illustrates a left side view, a front view, a right side view, and a rear view of the game apparatus 10 in the closed state.

FIG. 1 and FIG. 2 are each a plan view of an outer appearance of a game apparatus 10. The game apparatus 10 is a hand-held game apparatus, and is configured to be foldable as shown in FIG. 1 and FIG. 2. FIG. 1 shows the game apparatus 10 in an opened state, and FIG. 2 shows the game apparatus 10 in a closed state. FIG. 1 is a front view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 and FIG. 2. The game apparatus 10 includes a lower housing 11 and an upper housing 21 as shown in FIG. 1 and FIG. 2. The lower housing 11 and the upper housing 21 are connected to each other so as to be openable and closable (foldable).

(Description of Lower Housing)

Initially, a structure of the lower housing 11 will be described. As shown in FIG. 1 and FIG. 2, in the lower housing 11, a lower LCD (Liquid Crystal Display) 12, a touch panel 13, operation buttons 14A to 14L, an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The number of pixels of the lower LCD 12 may be, for example, 320 dots×240 dots (the horizontal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 2(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which slides parallel to the inner side surface of the lower housing 11. The analog stick 15 acts in accordance with a program executed by the game apparatus 10. For example, when a game in which a predetermined object emerges in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone (see FIG. 3) is provided as a sound input device described below, and the microphone detects for a sound from the outside of the game apparatus 10.

FIG. 2(a) is a left side view of the game apparatus 10 in the closed state. FIG. 2(b) is a front view of the game apparatus 10 in the closed state. FIG. 2(c) is a right side view of the game apparatus 10 in the closed state. FIG. 2(d) is a rear view of the game apparatus 10 in the closed state. As shown in FIG. 2(b) and FIG. 2(d), an L button 14G and an R button 14H are provided on the upper side surface of the lower housing 11. The L button 14G and the R button 14H act as shutter buttons (imaging instruction buttons) of the imaging section. Further, as shown in FIG. 2(a), a sound volume button 14I is provided on the left side surface of the lower housing 11. The sound volume button 14I is used for adjusting a sound volume of a speaker of the game apparatus 10.

As shown in FIG. 2(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2(d), an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIG. 1 and FIG. 2(c), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 2(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 and FIG. 2, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23*a* and 23*b*) provided on the outer side surface (the back surface reverse of the main surface on which the upper LCD 22 is provided) 21D of the upper housing 21 are generically referred to as the outer imaging section 23. The imaging directions of the outer imaging section (left) 23*a* and the outer imaging section (right) 23*b* are each the same as the outward normal direction of the outer side surface 21D. The outer imaging section (left) 23*a* and the outer imaging section (right) 23*b* can be used as a stereo camera depending on a program executed by the game apparatus 10. Each of the outer imaging section (left) 23*a* and the outer imaging section (right) 23*b* includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25*a* of the 3D adjustment switch 25 is slidable to any position in a predetermined direction (along the longitudinal direction of the right side surface), and a display mode of the upper LCD 22 is determined in accordance with the position of the slider 25*a*. Further, a manner in which the stereoscopic image is visible is adjusted in accordance with the position of the slider 25*a*. Specifically, an amount of deviation in the horizontal direction between a position of an image for a right eye and a position of an image for a left eye is adjusted in accordance with the position of the slider 25*a*.

The 3D indicator 26 indicates whether or not the upper LCD 22 is in the stereoscopic display mode. The 3D indicator 26 is implemented as an LED, and is lit up when the stereoscopic display mode of the upper LCD 22 is enabled. The 3D indicator 26 may be lit up only when the upper LCD 22 is in the stereoscopic display mode, and program processing for displaying a stereoscopically visible image is performed.

Further, a speaker hole 21E is provided on the inner side surface of the upper housing 21. A sound from a speaker 43 described below is outputted through the speaker hole 21E.

(Internal Configuration of Game Apparatus 10)

Figure 3:
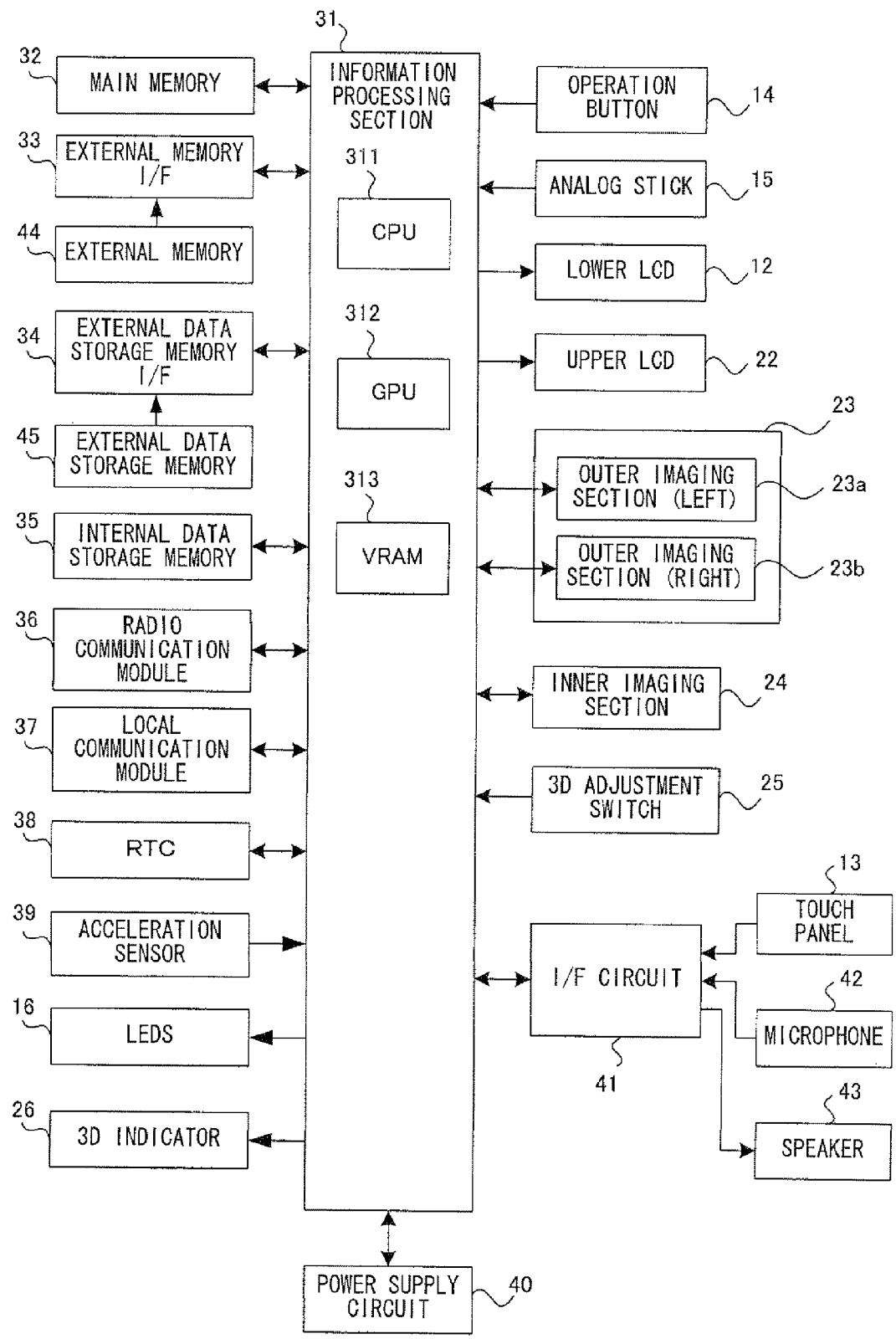
FIG. 3 is a block diagram illustrating an internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10 to execute a process according to the program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the processing based on the above program, and temporarily stores a program obtained from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, communication using a proprietary protocol, or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10. In addition to (or in place of) the acceleration sensor 39, another sensor such as an angular sensor or an angular velocity sensor may be connected to the information processing section 31, and the sensor may detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

LEDs 16 (16A and 16B) are connected to the information processing section 31. Using the LEDs 16, the information processing section 31 notifies a user of an ON/OFF state of a power supply of the game apparatus 10, or notifies the user of an establishment state of a wireless communication of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 obtains the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 obtains the operation data from the operation button 14 to perform a process in accordance with the input on the operation button 14.

The analog stick 15 is connected to the information processing section 31. Operation data indicating an analog input (direction of operation and amount of operation) to the analog stick 15 is outputted from the analog stick 15 to the information processing section 31. The information processing section 31 obtains the operation data from the analog stick 15 to execute a process according to the input to the analog stick 15.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 22 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. In the present embodiment, the information processing section 31 lights up the 3D indicator 26 when the upper LCD 22 is in the stereoscopic display mode. The game apparatus 10 has the internal configuration as described above.

(Outline of Characteristic Operations)

Figure 4:
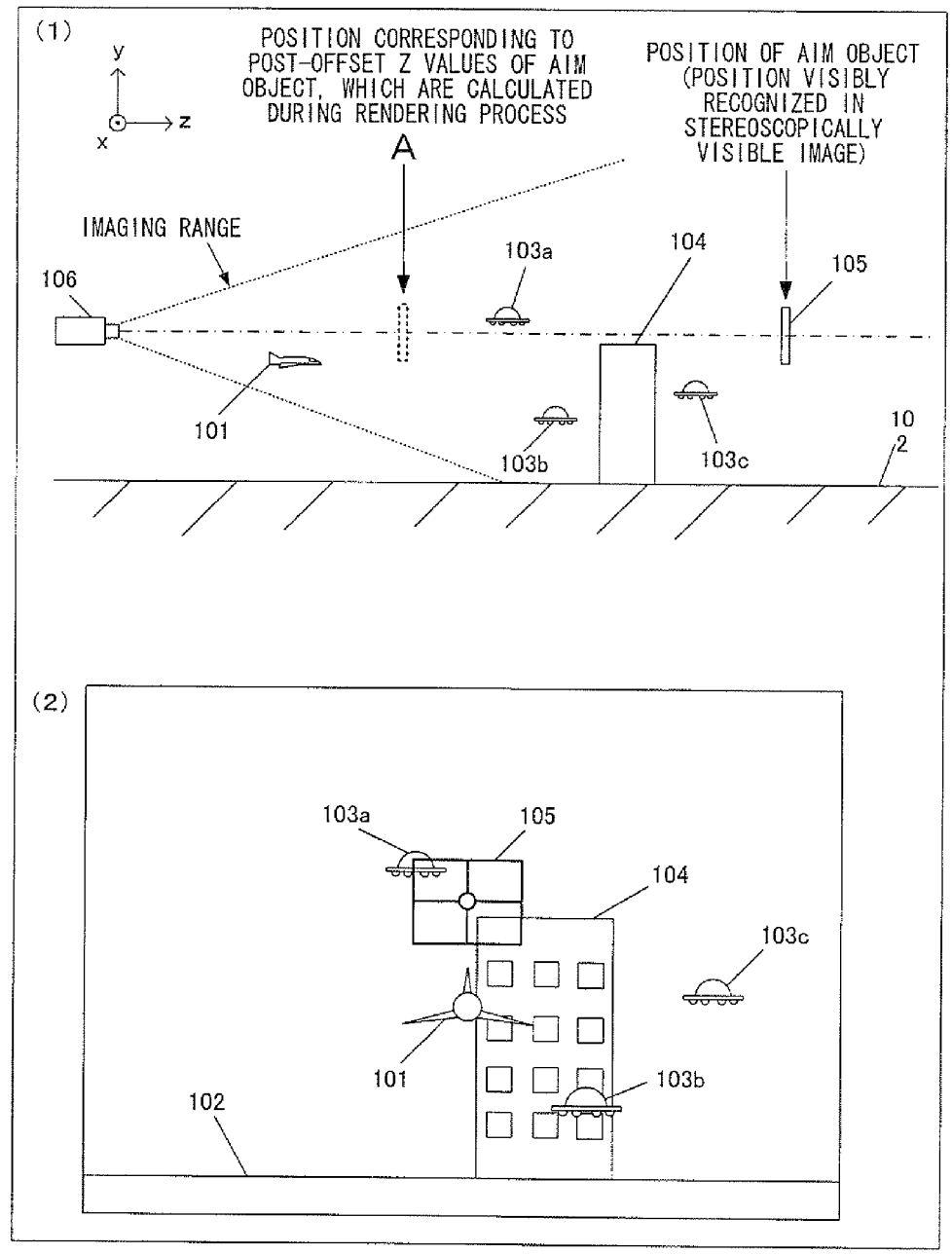
FIG. 4 is a diagram illustrating an example of a virtual three-dimensional space, and an image (a stereoscopically visible image viewed by a user) that is obtained by taking the virtual three-dimensional space with a virtual stereo camera.
Figure 5:
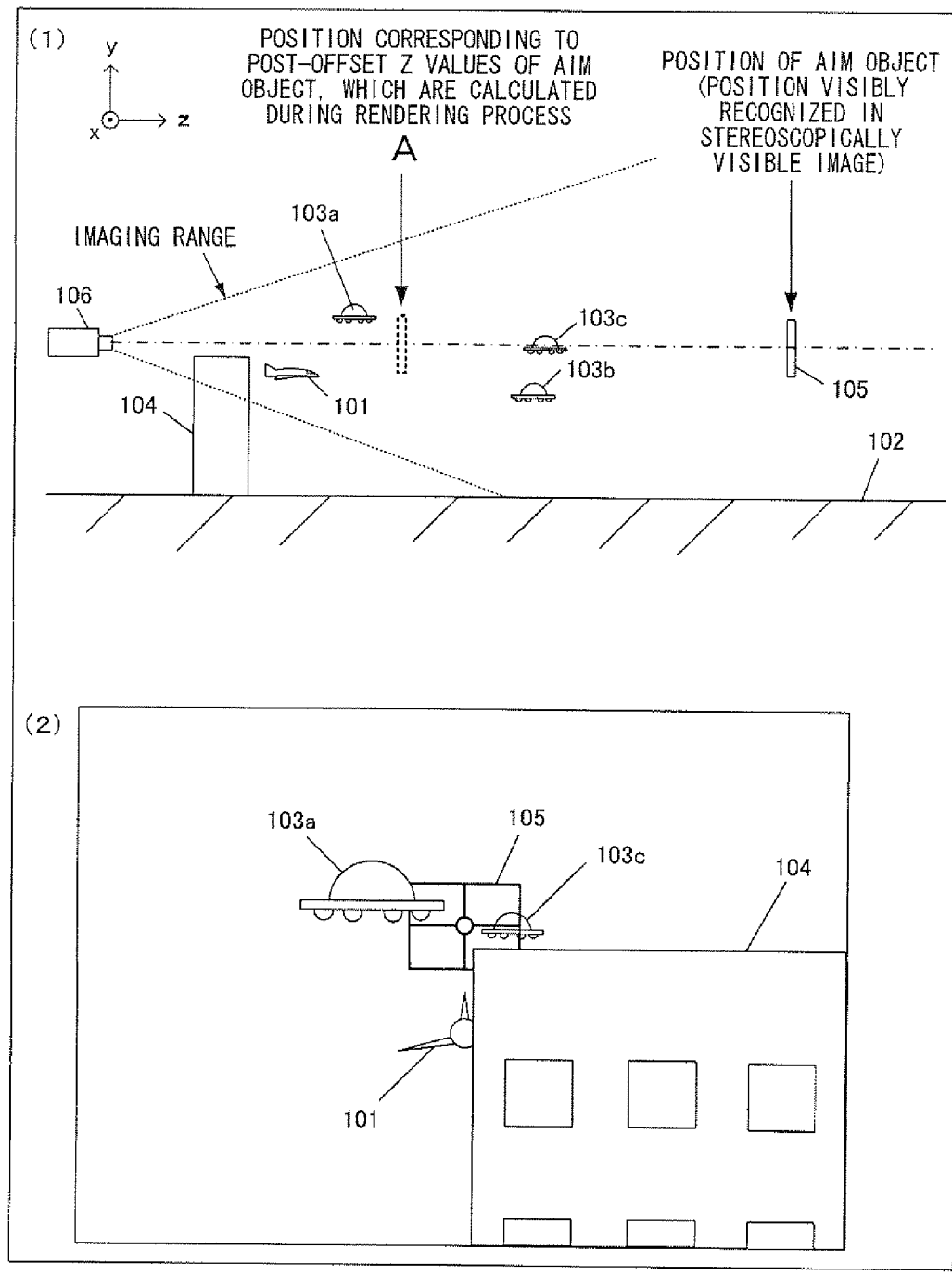
FIG. 5 is a diagram illustrating an example of a virtual three-dimensional space, and an image (a stereoscopically visible image viewed by a user) that is obtained by taking the virtual three-dimensional space with a virtual stereo camera.
Figure 6:
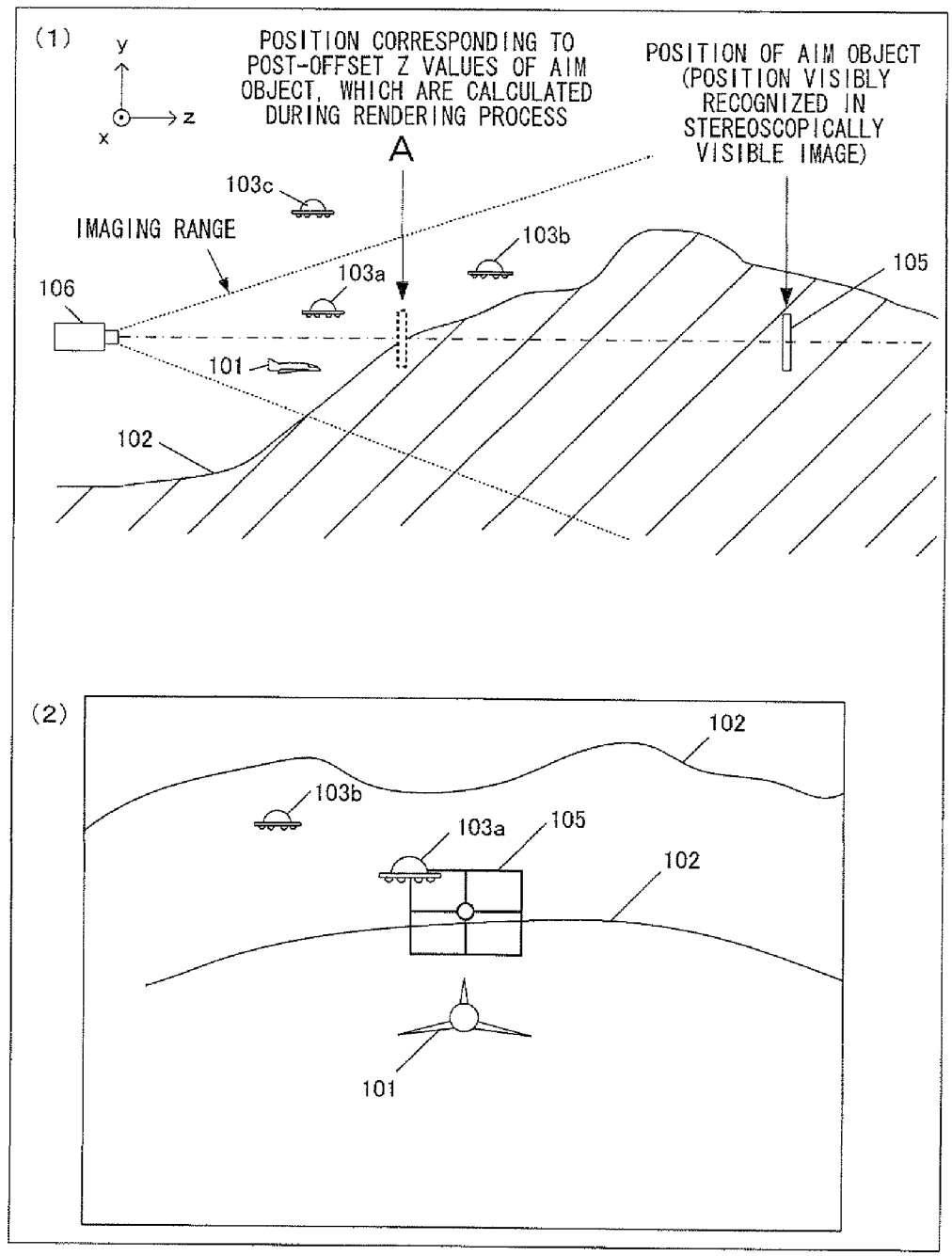
FIG. 6 is a diagram illustrating an example of a virtual three-dimensional space, and an image (a stereoscopically visible image viewed by a user) that is obtained by taking the virtual three-dimensional space with a virtual stereo camera.

Hereinafter, an outline of characteristic operations according to the present embodiment will be described with reference to FIGS. 4 to 6. Each of FIGS. 4 to 6 illustrates an example of a virtual three-dimensional space, and an image (a stereoscopically visible image visually recognized by a user) obtained by taking the virtual three-dimensional space using a virtual stereo camera 106 described later. In each of FIGS. 4 to 6 and 11, (2) shows a stereoscopically visible image composed of an image for a left eye and an image for a right eye, in which a parallax is set between these images. Actually, the stereoscopically visible image is stereoscopically viewed by both eyes of a user. However, the stereoscopically visible image is illustrated as a planar image because of limitation on drawing expression.

In the present embodiment, for example, a shooting game is considered, which is progressed from a so-called third person viewpoint. As shown in FIG. 4(1), a user operates an own plane object 101 (which may be referred to as a user object) to shoot an enemy plane object 103a or the like in the virtual three-dimensional space. In the present embodiment, the virtual three-dimensional space is taken by the virtual stereo camera 106 (hereinafter simply referred to as a virtual camera 106) which is placed behind the own plane object 101 in the virtual three-dimensional space, thereby generating an image for a left eye and an image for a right eye. These images are displayed as a stereoscopically visible image on the upper LCD 22. Hereinafter, the shooting game will be described in detail.

As shown in FIG. 4(1), placed in the virtual three-dimensional space are: the own plane object 101 to be operated by the user; a topography object 102 such as ground; enemy plane objects 103a, 103b, and 103e as shooting targets; a structure object 104 such as a building; an aim object 105 indicating a direction of shooting by the own plane object 101; and the virtual camera 106 for taking an image of a view in a direction where the own plane object 101 is present, from rear of the own plane object 101.

In the present embodiment, when the virtual camera 106 takes the virtual three-dimensional space to generate (render) a stereoscopically visible image, a Z-buffer algorithm described below is adopted. Since the Z-buffer algorithm is generally known, detailed description thereof will be omitted. In the Z-buffer algorithm, each of pixels constituting a display screen on which a display image is rendered is caused to have information relating to depth (Z value) as well as color information. The Z value is a value representing a depth from the virtual camera. The Z value is "0.0" at the position of the virtual camera, and gradually approaches "1.0" with distance from the virtual camera. When rendering the display image on the display screen, the already-set Z value is compared with the Z value of a portion of object to be rendered, for each pixel of the display screen. This comparison is referred to as a Z test. If the latter Z value is smaller than the former Z value, the color of the portion of the object to be rendered is given to the corresponding pixel, and the former Z value is overwritten (updated) with the latter Z value. Thereby, another object (or a portion of another object) that is ought to be hidden behind an anterior object (an object on the virtual camera side) is not rendered.

As shown in FIG. 4(1), the aim object 105 is placed at a position that is in the imaging direction of the virtual camera 106, and apart from the virtual camera 106 by a predetermined distance. The own plane object 101 is placed at a position that is within the imaging range of the virtual camera 106, between the virtual camera 106 and the aim object 105, and a little ahead of the virtual camera 106. When the virtual three-dimensional space taken by the virtual camera 106 is rendered using the Z-buffer algorithm, the Z value of the aim object 105 is offset (shifted) by a predetermined amount in a direction in which the aim object 105 approaches the virtual camera 106. For example, if the Z value of a certain portion of the aim object 105 is calculated as "0.7" in the rendering process, the Z value of this portion is offset by a predetermined amount (for example, by "0.4") to set the Z value to "0.3". As shown in FIG. 4(1), the own plane object 101 is placed at a position that is between the virtual camera 106 and a position (position A in FIG. 4(1)) corresponding to the post-offset Z value, and apart from the position A by a predetermined distance.

FIG. 4(2) shows a display image (stereoscopically visible image) that is obtained by rendering the virtual three-dimensional space in the state shown in FIG. 4(1) with the Z values being offset as described above using the Z-buffer algorithm. As shown in FIG. 4(2), the aim object 105 is rendered in the virtual three-dimensional space although portions thereof are hidden by the enemy plane object 103a and the structure object 104 (refer to FIG. 4(1)). The reason is as follows. As described with reference to FIG. 4(1), the Z values of the respective portions of the aim object 105, which are calculated in the rendering process, are offset to the value corresponding to the position A.

As described above, in the rendering process using the Z-buffer algorithm according to the present embodiment, the stereoscopically visible image is rendered with the Z values of the respective portions of the aim object 105 being offset. Thereby, in the stereoscopically visible image shown in FIG. 4(2), the aim object 105 is rendered with a sense of depth (parallax) according to the position where the aim object 105 is placed in the virtual three-dimensional space. In addition, even if there are objects (103a and 104) that are placed between the virtual camera 106 and the aim object 105 (placed deeper than the position A) and block the aim object 105, the aim object 105 is preferentially rendered without being hidden by these objects. As a result, the aim object 105 can be naturally and stereoscopically displayed with a sense of depth, without losing its function as an aim.

FIG. 5(1) shows the virtual three-dimensional space at a point in time when a predetermined period has passed from the state shown in FIG. 4(1). As shown in FIG. 5(1), the virtual camera 106, the aim object 105, and the own plane object 101 have moved forward (in a axis positive direction) from the state of FIG. 4(1) while keeping the above-described positional relationship in the virtual three-dimensional space. Thereby, the structure object 104 is placed between the virtual camera 106 and the own plane object 101. The enemy plane object 103a is placed between the virtual camera 106 and the position A.

FIG. 5(2) shows a display image (stereoscopically visible image) that is obtained by rendering the virtual three-dimensional space in the state shown in FIG. 5(1) with the Z values being offset by using the Z buffer algorithm as described with reference to FIG. 4(1). As shown in FIG. 5(2), the aim object 105 is rendered without being hidden by the enemy plane object 103c that is placed deeper (in the z axis positive direction) than the position A (refer to FIG. 5(1)). On the other hand, the aim object 105 is partially hidden (blocked) by the enemy plane object 103a and the structure object 104 which are placed anterior to (in a z axis negative direction) the position A.

As described above, in the stereoscopically visible image shown in FIG. 5(2), the aim object 105 is rendered with a sense of depth (parallax) according to the position where the aim object 105 is placed in the virtual three-dimensional space. In addition, even if there is an object (103c) that is placed between the virtual camera 106 and the aim object 105 (placed deeper than the position A) and partially blocks the aim object 105, the aim object 105 is preferentially rendered without being partially blocked by this object.

On the other hand, the aim object 105 is partially hidden (blocked) by an object (103a) that is placed between the own plane object 101 and the position A. In the shooting game of the present embodiment, if the own plane object 101 shoots and destroys (blows up) an enemy plane object that is positioned within a predetermined distance from the own plane object 101, the own plane object 101 is damaged by the destruction. In the present embodiment, as shown in FIG. 5(1), a space is provided between the own plane object 101 and the position A, and thereby the aim object 105 is not displayed (rendered) in preference to an enemy plane object or the like that is positioned so near to the own plane object 101 that the own plane object 101 is damaged when it shoots and destroys the enemy plane object.

FIG. 6(1) shows the virtual three-dimensional space at a point in time when a predetermined period has passed from the state shown in FIG. 5(1). As shown in FIG. 6(1), the virtual camera 106, the aim object 105, and the own plane object 101 have moved forward (in the z axis positive direction) from the state shown in FIG. 5(1) in the virtual three-dimensional space. Thereby, the structure object 104 is outside the imaging range of the virtual camera 106, and a mountain part of the topography object 102 approaches the own plane object 101.

FIG. 6(2) shows a display image (stereoscopically visible image) obtained by rendering the virtual three-dimensional space in the state shown in FIG. 6(1) with the Z values being offset by using the Z-buffer algorithm as described with reference to FIG. 4(1). In the present embodiment, even if the aim object 105 is hidden (blocked) by the topography object 102 in the rendering process using the Z-buffer algorithm, the aim object 105 is constantly rendered. That is, the aim object 105 is always rendered in preference to the topography object 102. Specifically, even in the situation at the position A shown in FIG. 6(1) (even when a bottom portion of the aim object 105 is hidden by the topography object 102), the entirety of the aim object 105 is rendered without being hidden by the topography object 102 as shown in FIG. 6(2). In the present embodiment, the above-described rendering is realized as follows. That is, when performing the rendering process, according to the Z-buffer algorithm, in such a manner that the Z value of the aim object 105 and the Z value of the topography object 102 are compared with each other (are subjected to Z test) for each pixel of a rendering target, if the Z value of the former object is greater than the Z value of the latter object (that is, if the aim object 105 is farther from the virtual camera 106 than the topography object 102), the rendering process is performed as if the Z value of the former object is smaller than the Z value of the latter object (that is, as if the aim object 105 is nearer to the virtual camera 106 than the topography object 102). The detail of this rendering process will be described later with reference to FIG. 9.

In the present embodiment, as described above, the aim object 105 is always rendered in preference to the topography object 102. Thereby, even if the mountain approaches the own plane object 101 as shown in FIG. 6(1), the aim object 105 is continuously displayed with a sense of depth, without being hidden by the mountain. Therefore, the user is prevented from losing sight of the aim object 105.

As described above, according to the present embodiment, when stereoscopically displaying the virtual three-dimensional space, the indication object (aim object 105) for indicating a position in the virtual three-dimensional space can be naturally and stereoscopically displayed with a sense of depth, without losing its function.

(Details of Game Processing)

Figure 7:
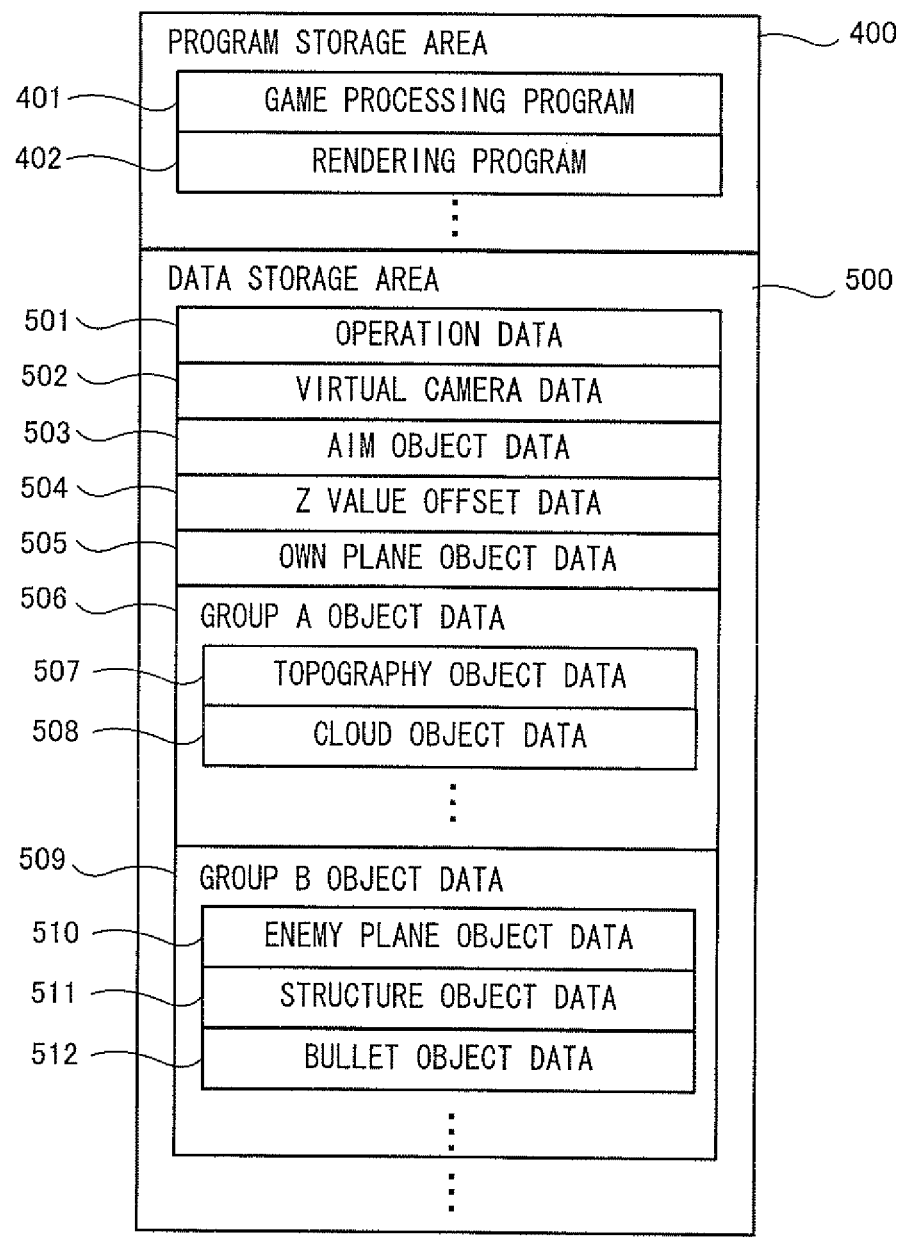
FIG. 7 is a diagram illustrating a memory map of a main memory 32 of the game apparatus 10.

Hereinafter, game processing to be executed by the game apparatus 10 will be described in detail. First, data to be stored in the main memory 32 during the game processing will be described. FIG. 7 shows a memory map of the main memory 32 of the game apparatus 10. As shown in FIG. 7, the main memory 32 includes a program storage area 400 and a data storage area 500. A part of data in the program storage area 400 and a part of data in the data storage area 500 are stored in, for example, the external memory 44, and are read and stored in the main memory 32 when executing the game processing.

Figure 8:
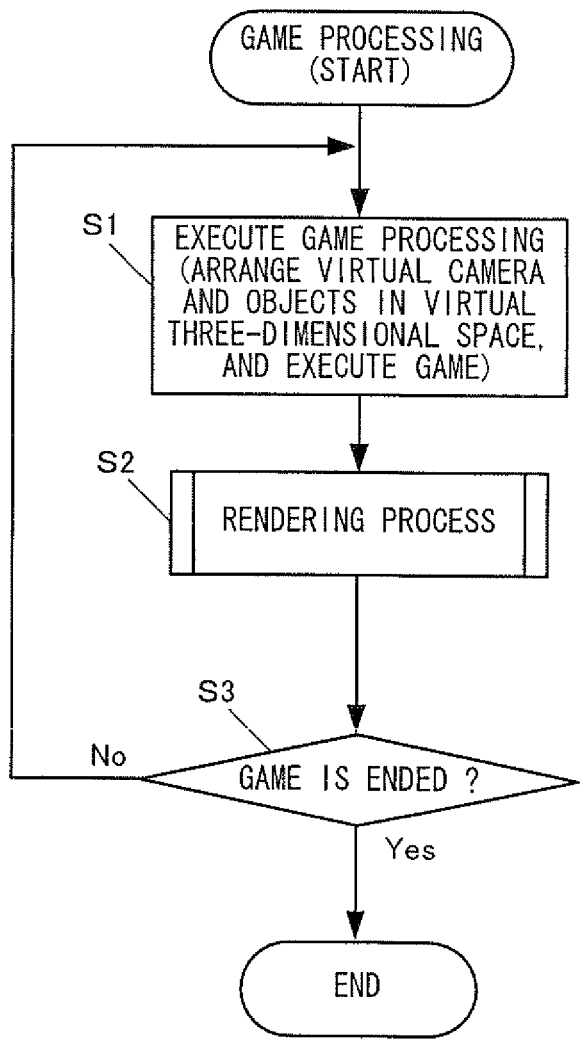
FIG. 8 is a flowchart illustrating an example of game processing to be executed by the game apparatus 10.
Figure 9:
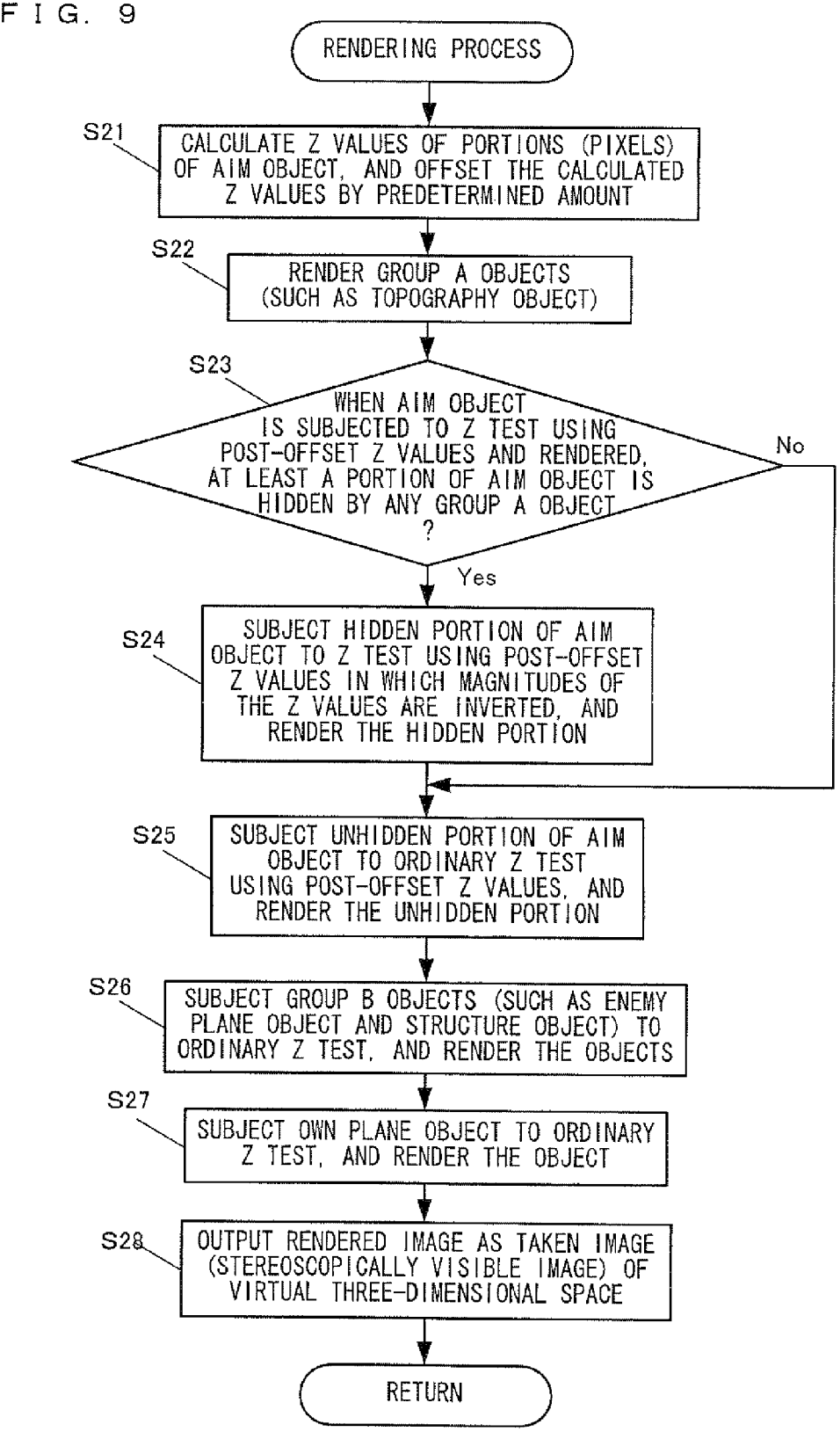
FIG. 9 is a flowchart illustrating an example of a rendering process in step S2 in FIG. 8.
Figure 10:
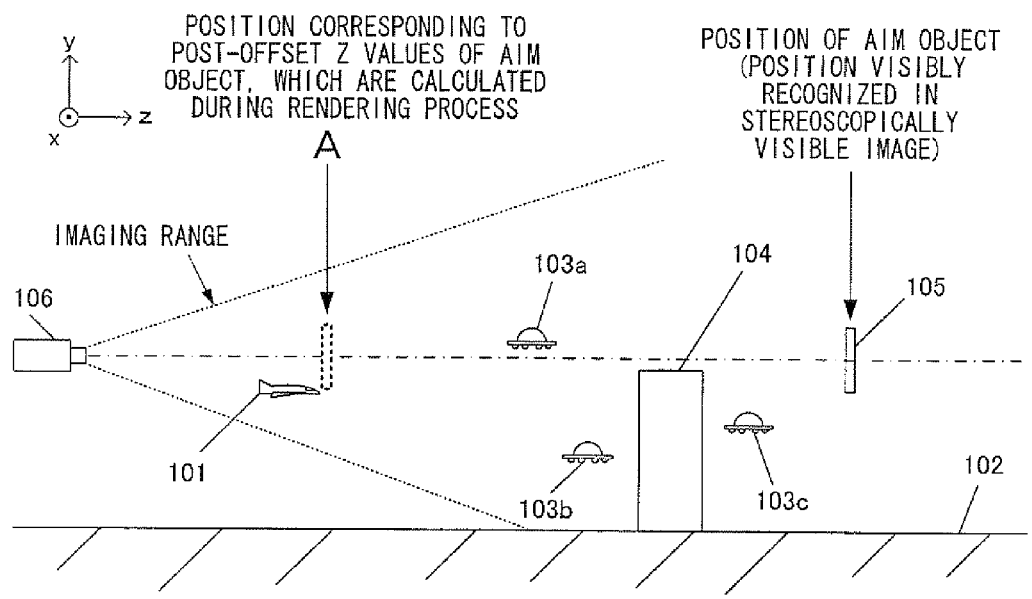
FIG. 10 is a diagram illustrating an example of a virtual three-dimensional space.

The program storage area 400 has, stored therein, programs such as a game processing program 401 for executing a process of a flowchart shown in FIG. 8 and a rendering program 402 for executing a process of a flowchart shown in FIG. 9. These flowcharts will be described later.

The data storage area 500 has, stored therein, operation data 501, virtual camera data 502, aim object data 503, Z value offset data 504, own plane object data 505, group A object data 506, group 13 object data 509 and the like.

The operation data 501 represents a user operation performed on the respective operation buttons 14A to 14E and 14G to 14H and the analog stick 15. The operation data 501 represents, for example, a user operation in which the user causes the own plane object 101 to swivel up, down, and side to side, or a user operation in which the user causes the own plane object 101 to perform shooting.

The virtual camera data 502 represents the position, imaging direction, and imaging angle of the virtual camera 106 in the virtual three-dimensional space (refer to FIG. 4 or the like).

The aim object data 503 represents the position, orientation, shape (polygon shape), color (texture) and the like of the aim object 105 in the virtual three-dimensional space.

The Z value offset data 504 is a predetermined value that is used for offsetting (shifting), by a predetermined amount, a Z value (Z=0.0 to 1.0) indicating a depth of the aim object 105 from the virtual camera 106 when rendering the virtual three-dimensional space using the Z-buffer algorithm. In the present embodiment, the Z value offset data 504 is "0.4", for example.

The own plane object data 505 represents the position, orientation, shape (polygon shape), color (texture) and the like of the own plane object 101 in the virtual three-dimensional space (refer to FIG. 4 or the like).

The group A object data 506 includes data of objects that belong to group A, such as topography object data 507 and cloud object data 508. The aim object 105 is always rendered in preference to the objects that belong to the group A, which will be described later in detail with reference to FIG. 9.

The topography object data 507 represents the position, orientation, shape (polygon shape), color (texture) and the like of the topography object 102 (refer to FIG. 4 or the like).

The cloud object data 508 represents the position, orientation, shape (polygon shape), color (texture) and the like of a cloud object (not shown) which is one of objects representing the background.

The group B object data 509 includes data of objects that belong to group B, such as enemy plane object data 510, structure object data 511, and bullet object data 512. Depending on the positions (depths) of the objects that belong to the group B, the aim object 105 is rendered in preference to the objects that belong to the group B, which will be described later in detail with reference to FIG. 9.

The enemy plane object data 510 represents the positions, orientations, shapes (polygon shapes), colors (textures) and the like of the enemy plane objects 103a to 103c (refer to FIG. 4 or the like).

The structure object data 511 represents the position, orientation, shape (polygon shape), color (texture) and the like of the structure object 104 (refer to FIG. 4 or the like).

The bullet object data 512 represents the positions, orientations, shapes (polygon shapes), colors (textures) and the like of ballet objects (not shown) that are discharged from the own plane object 101 and the enemy plane objects 103a to 103c.

Next, a flow of the game processing to be executed by the game apparatus 10 will be described with reference to FIG. 8. When the game apparatus 10 is powered on, the CPU 311 of the game apparatus 10 executes a startup program stored in the internal data storage memory 35, and thereby the respective units such as the main memory 32 are initialized. Then, the game processing program 401 and the like, which are stored in the external memory 44, are loaded into the main memory 32, and the game processing program 401 is executed by the CPU 311.

FIG. 8 is an example of a flowchart of the game processing to be executed by the CPU 311. The processing shown in the flowchart of FIG. 8 is repeatedly executed for each frame (one frame corresponds to 1/60 second, for example). In the following description, processes that do not directly relate to the present invention will not be described.

First, in step S1, the CPU 311 executes the game processing. Specifically, the CPU 311 places the virtual camera 106, the aim object 105, the own plane object 101, the enemy plane objects 103a to 103c, the structure object 104, the topography object 102 and the like, in the virtual three-dimensional space, based on the virtual camera data 502, the aim object data 503, the own plane object data 505, the group A object data 506, and the group B object data 509. As already described with reference to FIGS. 4 to 6, the aim object 105 is placed at a position that is a predetermined distance apart from the virtual camera 106 in the imaging direction of the virtual camera 106. The own plane object 101 is placed at a position that is between the virtual camera 106 and the position A and is a predetermined distance apart from the position A. The own plane object 101 is placed such that its forward direction aligns with the imaging direction of the virtual camera 106. Then, the CPU 311 causes the virtual camera 106, the aim object 105, and the own plane object 101 in the virtual three-dimensional space to automatically (forcibly) move in the forward direction (in the z axis positive direction shown in FIG. 4(1) or the like) at a predetermined speed.

Then, the CPU 311 reflects an operation performed by the user, to the progress in the game, based on the operation data 501. For example, if the user performs an operation to change the moving direction of the own plane object 101 (i.e., an operation to swivel the own plane object 101), the CPU 311 causes the own plane object 101 to swivel in accordance with the operation. At this time, the CPU 311 maintains the positional relationship between these objects (refer to FIG. 4(1) or the like). Thereby, the position of the aim object 105 is moved in coordination with the change in the moving direction of the own plane object 101. For example, if the user performs an operation to cause the own plane object 101 to perform shooting, the CPU 311 causes the own plane object 101 to discharge a bullet object, and causes the discharged bullet object to move toward the aim object 105. If the bullet object hits an enemy plane object (103a or the like), the CPU 311 destroys the enemy plane object. If the enemy plane object is destroyed (blown up) at a position nearer to the own plan object 101 than the position A, the CPU 311 causes damage due to this blowup to the own plan object 101. If a bullet object discharged from the enemy plane object hits the own plane object 101, the CPU 311 causes damage to the own plane object 101. If the own plane object 101 crashes into the enemy plane object (103a or the like), or the structure object 104, or the topography object 102, the CPU 311 causes damage to the own plane object 101. After the above-described step S1, the process goes to step S2.

In step S2, the GPU 312 performs a process of rendering the virtual three-dimensional space in which the game progresses according to step S1. Thereafter, the process goes to step S3. The rendering process in step S2 will be described later with reference to FIG. 9.

In step S3, the CPU 311 determines whether the game has ended. Specifically, the CPU 311 determines whether the game progressing in the virtual three-dimensional space is in a predetermined end state, and determines, based on the operation data 501, whether the user has performed an operation to end the game. When the game is in the predetermined end state or when the user has performed an operation to end the game (YES in step S3), the CPU 311 ends the game. On the other hand, when the determination in step S3 is NO, the CPU 311 returns the process to step S1.

FIG. 9 is an example of a flowchart illustrating the rendering process in step S2 of FIG. 8. In the following description, the GPU 312 executes the entirety of the rendering process shown in FIG. 9. However, a part of the rendering process may be executed by the CPU 311. When each object is rendered in the VRAM 313 by the rendering process using the Z-buffer algorithm, depth comparison (Z test) is performed pixel by pixel, and rendering is performed pixel by pixel. Further, since the virtual camera 106 is a stereo camera, an image for a left eye and an image of a right eye are respectively rendered in the VRAM 313 in the following rendering process. However, rendering of the both images will be integrally described in order to simplify the description.

First, in step S21, the GPU 312 calculates a Z value (depth) of each of portions of the aim object 105, and offsets (shifts) the calculated Z value by a predetermined amount. Specifically, the GPU 312 offsets, with reference to the Z value offset data 504, the Z value of each portion of the aim object 105 by "0.4" in a direction in which the aim object 105 approaches the virtual camera 106 (refer to position A in FIG. 4(1) or the like). Thereafter, the process goes to step S22. The offset process in step S21 is performed so as to adjust an anteroposterior relationship between the aim object 105 and the group B objects and the like. When the anteroposterior relationship need not be adjusted, the Z value may not be offset or the Z value may be set to 0.

In step S22, the GPU 312 renders the group A objects (topography object 102 and the like) in the VRAM 313. Thereafter, the process goes to step S23.

In step S23, the GPU 312 determines whether at least a portion of the aim object 105 is hidden by any of the group A objects when the aim object 105 is rendered, by performing a Z test using the Z values that were offset in step S21 (hereinafter, referred to as "post-offset Z values"). Specifically, the GPU 312 compares, for each of the pixels in the Z buffer, the Z values of the group A objects rendered in step S22 with the post-offset Z values of the aim object 105. When there are pixels in which the latter Z values are greater than the former Z values, the GPU 312 determines that at least a portion of the aim object 105 is hidden by any of the group A objects. When the determination in step S23 is YES, the process goes to step S24. When the determination in step S23 is NO, the process goes to step S25.

In step S24, the GPU 312 performs a Z test using the post-offset Z values, on the portion of the aim object 105 which is determined in step S23 as being hidden by the group A object, in such a manner that the magnitudes of the Z values are inverted. Then, the GPU 312 renders the portion of the aim object 105 in the VRAM 313. For example, in a case where "0.28" is set as a Z value of a pixel in the Z buffer, which pixel corresponds to a certain pixel in the display screen in which the group A objects are rendered, and where a post-offset Z value corresponding to this pixel in the Z buffer is "0.30", the GPU 312 determines, in the Z test, that the latter Z value (i.e., "0.30") is smaller than the former Z value. That is, the GPU 312 performs determination with the magnitudes of the Z values being inverted. Then, the GPU 312 renders, in the pixel in the display screen, the color of the portion of the aim object 105, which portion corresponds to the pixel in the display screen, and updates the Z value of the pixel in the Z buffer by the post-offset Z value "0.30". When the GPU 312 renders the portion of the aim object 105 in step S24, the GPU 312 sets a parallax between the image for a left eye and the image for a right eye, based on the Z values before the offsetting in step S21 (hereinafter referred to as "pre-offset Z values"). Thereafter, the process goes to step S25. It should be noted that, the same effect can be achieved by, without using the method of inverting the magnitudes of the Z values as described above, rendering the color of a portion of the aim object 105 in a pixel when a post-offset Z value is greater than a Z value of the corresponding pixel in the Z buffer.

In step S25, the GPU 312 performs an ordinary Z test using the post-offset Z values (i.e., a Z test in which the magnitudes of the Z values are not inverted), on a portion (an unhidden portion) of the aim object 105, which is determined in step S23 as not being hidden by the group A objects. Then, the GPU 312 renders the unhidden portion of the aim object 105 in the VRAM 313. When the GPU 312 renders the unhidden portion of the aim object 105 in step S25, the GPU 312 sets, as in step S24, a parallax between the image for a left eye and the image for a right eye, based on the pre-offset Z values. Thereafter, the process goes to step S26.

In the processes in steps S23 to S25, the hidden part and the unhidden part of the aim object 105 are processed separately; however, in another embodiment, by performing, for all the portions of the aim object 105, both of the rendering process using the ordinary Z test and the rendering process using the Z test in which the magnitudes of the Z values are inverted, whether each of the portions is hidden or unhidden need not be determined because if a part of the aim object 105 is not rendered when the ordinary Z test is performed, the part of the aim object 105 is rendered when the Z test in which the magnitudes of the Z values are inverted is performed. In this case, instead of performing the two processes, two aim objects 105 having the same shape may be provided at the same position so that the ordinary Z test is performed for one of the two aim objects 105 and the Z test in which the magnitudes of the Z values are inverted is performed for the other of the two aim objects 105. Further, in this case, by displaying the aim object 105 for which the Z test in which the magnitudes of the Z values are inverted is performed so as to be translucent, a user feels less uncomfortable when the aim object 105 which is placed at a position deeper than a position of the other object is superimposed on the other object. That is, the aim object 105 is rendered in preference to the object in front of the aim object 105 and by rendering the portion of the aim object 105 that is overlapped by the object in front of the aim object 105 so as to be translucent, the aim object 105 can be displayed at a deeper position due to a parallax and constantly displayed in a natural manner. When the aim object 105 is rendered translucent, the aim object 105 is preferentially rendered after the other object which is in front of the aim object 105 is rendered. In order to constantly display the aim object 105, for example, the aim object 105 is preferentially rendered after the other object, the group B objects and the own plane object 101 are rendered. Alternatively, when it is determined whether at least a portion of the aim object 105 is hidden, if it is determined that at least a portion of the aim object 105 is hidden, the entirety of the aim object 105 may be rendered translucent. Furthermore, other than rendering the aim object 105 translucent, the color of the aim object 105 may be changed to a lighter color, the texture of the aim object 105 may be changed, or the like so that the aim object 105 may be viewed in a natural manner.

In step S26, the GPU 312 performs an ordinary Z test (a Z test in which the magnitudes of the Z values are not inverted) on the group B objects (such as the enemy plane objects 103a to 103c and the structure object 104), and renders the group B objects in the VRAM 313. Thereafter, the process goes to step S27.

In step S27, the GPU 312 performs an ordinary Z test (a Z test in which the magnitudes of the Z values are not inverted) on the own plane object 101, and renders the own plane object 101 in the VRAM 313. Thereafter, the process goes to step S28.

In step S28, the GPU 312 outputs, to the upper LCD 22, an image (a stereoscopically visible image composed of an image for a left eye and an image for a right eye) that is rendered in the VRAM 313 through the processes in steps S21 to S27. As a result, the stereoscopically visible image of the virtual three-dimensional space, which is taken by the virtual camera 106, is displayed on the upper LCD 22. Thereafter, the process goes to step S3 in FIG. 8.

As described above, in the rendering process using the Z-buffer algorithm according to the present embodiment, the Z values of the aim object 105 are offset, and a stereoscopically visible image is rendered in accordance with the preference order of object rendering based on the post-offset Z values. Further, in the rendering process, when rendering the aim object 105, a parallax between an image for a left eye and an image for a right eye is set based on the pre-offset Z values. Thereby, in the stereoscopically visible image (refer to FIG. 4(2) and the like), the aim object 105 can be rendered with a sense of depth (parallax) according to the position where the aim object 105 is placed in the virtual three-dimensional space. In addition, even if there is a group A object that is placed at a position between the virtual camera 106 and the aim object 105 (placed deeper than the position A) and blocks the aim object 105, the aim object 105 can be rendered without being hidden by the group A object.

Further, in the present embodiment, a portion of the aim object 105 is hidden by a group A object that is placed between the own plane object 101 and the position A and blocks the aim object 105 (refer to FIG. 5). Therefore, the user can identify an enemy plane object that causes damage to the own plane object 101 when it is shot and blown up.

Further, in the present embodiment, the aim object 105 is always rendered in preference to the topography object 102. Therefore, even when the mountain approaches the own plane object 101 as shown in FIG. 6(1), the aim object 105 is not hidden behind the mountain but is continuously rendered with a sense of depth. As a result, the user is prevented from losing sight of the aim object 105 even in a case where the user causes the own plane object 101 to thread through the mountains.

As described above, according to the present embodiment, when a virtual three-dimensional space is stereoscopically displayed, an indication object (aim object 105) that indicates a position in the virtual three-dimensional space can be naturally and stereoscopically displayed with a sense of depth, without losing its function.

Figure 11:
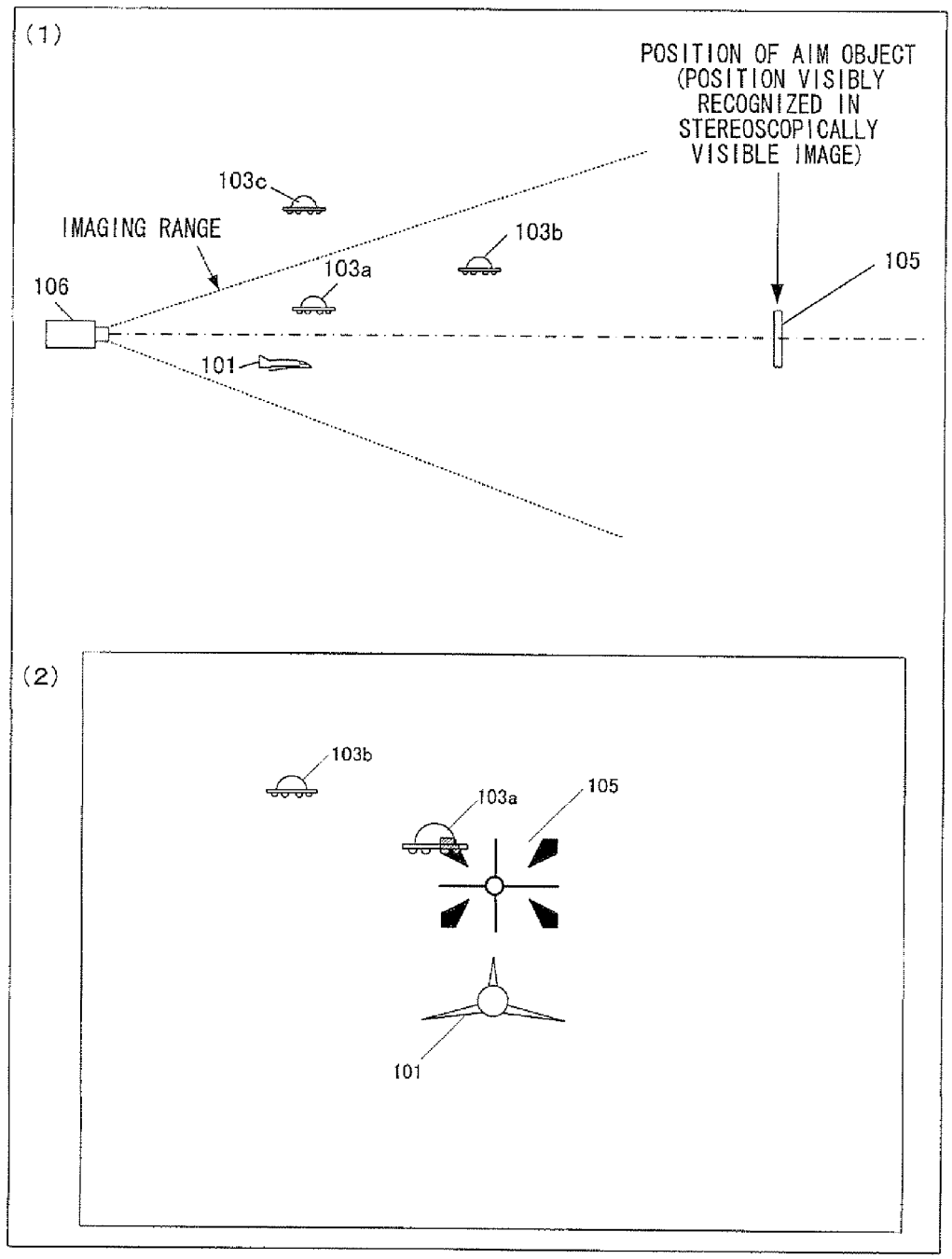
FIG. 11 is a diagram illustrating an example of a virtual three-dimensional space, and an image (a stereoscopically visible image viewed by a user) that is obtained by taking the virtual three-dimensional space with a virtual stereo camera.

In the present embodiment described above, the rendering process is performed as follows. That is, after the Z values of the aim object 105 are offset, it is determined whether at least a portion of the aim object 105 is hidden by any of the group A objects, and a hidden portion of the aim object 105, if any, is subjected to a Z test in which the magnitudes of the Z values are inverted, and then rendered (refer to steps S21, S23 to S25 in FIG. 9). However, as shown in FIG. 11(1), whether at least a portion of the aim object 105 is hidden by any other object may be determined without offsetting the Z values of the aim object 105, and a hidden portion of the aim object 105, if any, may be subjected to a Z test in which the magnitudes of the Z values are inverted, and then rendered. In this case, as shown in FIG. 11(2), the aim object 105 can be always displayed (rendered) in preference with a sense of depth. Alternatively, without determining whether at least a portion of the aim object 105 is hidden by any other object, two aim objects 105 having the same shape may be provided at the same position so that one of the two aim objects 105 is rendered by using the ordinary Z test and the other of the two aim objects 105 is rendered by using the Z test in which the magnitudes of the Z values are inverted. Further, in this case, by displaying the aim object 105 for which the Z test in which the magnitudes of the Z values are inverted is performed so as to be translucent, as shown in FIG. 11(2), a portion of the object which is viewed at a deeper position in a stereoscopically visible image is rendered in front so as to be translucent and blended with the surroundings, thereby allowing the user to feel less uncomfortable. That is, the aim object 105 is rendered in preference to an object in front of the aim object 105 and by rendering the portion of the aim object 105 being overlapped by the object in front of the aim object 105 so as to be translucent, the aim object 105 can be displayed at a deeper position and always displayed in a natural manner. When the aim object 105 is rendered translucent, the aim object 105 is preferably rendered after the other object which is in front of the aim object 105 is rendered. Furthermore, other than rendering the aim object 105 so as to be translucent, the color of the aim object 105 may be changed to a lighter color, the texture of the aim object 105 may be changed, or the like.

In the embodiment and modification described above, the aim object 105 is adopted as an example of an object whose Z values or the like are offset in the rendering process using the Z-buffer algorithm. However, the object whose Z values or the like are offset in the rendering process using the Z-buffer algorithm may be an object (indication object) for indicating a position in the virtual three-dimensional space. Moreover, the object whose Z values or the like are offset in the rendering process using the Z-buffer algorithm may be any object as long as it is an object (preferential display object) to be displayed (rendered) in preference to other objects in the virtual three-dimensional space. For example, it may be an object representing a specific character.

In the present embodiment, the present invention is applied to the game apparatus 10. However, the present invention is applicable not only to the game apparatus 10 but also to, for example, a portable information terminal apparatus such as a mobile phone, a personal handyphone system (PHS), or a personal digital assistant (PDA). The present invention is also applicable to a stationary game apparatus, a personal computer, or the like.

In the present embodiment, the above-described process is executed by the single game apparatus 10. However, a plurality of apparatuses which are communicable with each other in a wired or wireless manner may share the above-described process.

In addition, in the present embodiment, the shape of the game apparatus 10 is only an example. Further, the shapes of the various operation buttons 14 and the touch panel 13 which are provided on the game apparatus 1, the number of each of the operation buttons 14, and the touch panel 13, and the positions at which each of the operation buttons 14 and the touch panel 13 is mounted are examples only. Needless to say, other shapes, number, and mounting positions may be used in the present invention. Further, the order of the process steps, the setting values, values used for determination, and the like, which are used in the information processing described above, are only examples. Needless to say, the present invention can be realized using the other order of process steps and other values without departing from the scope of the invention.

The various information processing programs to be executed in the game apparatus 10 of the present embodiment may be supplied to the game apparatus 10 not only via a storage medium such as the external memory 44 but also via a wired or wireless communication line. Further, the programs may be previously stored in a non-volatile storage device (such as the internal data storage memory 35) provided in the game apparatus 10. Examples of the information storage medium having the programs stored therein include a CD-ROM, a DVD, any other optical disc-shaped storage medium similar to those, a flexible disk, a hard disk, a magnetic optical disk, a magnetic tape, and the like, in addition to a non-volatile memory. Further, the information storage medium having the programs stored therein may be a volatile memory that temporarily stores the programs.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored therein an information processing program to be executed by a computer of an information processing apparatus which displays a stereoscopically visible image of a virtual three-dimensional space taken by a virtual stereo camera, on a display apparatus capable of displaying a stereoscopically visible image, the information processing program causing the computer to provide functionality comprising:

a preferential display object placement for placing a preferential display object in an imaging range of the virtual stereo camera in the virtual three-dimensional space;

a stereoscopically visible image rendering for taking the virtual three-dimensional space using the virtual stereo camera, and rendering a stereoscopically visible image of the virtual three-dimensional space; and a display control for causing the display apparatus to display the stereoscopically visible image rendered by the stereoscopically visible image rendering; wherein the stereoscopically visible image rendering renders the preferential display object in preference to a predetermined object that is positioned in front of the preferential display object, such that a portion of the preferential display object being overlapped by the predetermined object is translucent.

2. The computer-readable storage medium having stored therein the information processing program according to claim 1, wherein the stereoscopically visible image rendering renders the preferential display object according to a preference order by which the predetermined object is preferentially rendered and renders the preferential display object according to a preference order by which the preferential display object is preferentially rendered, thereby rendering the portion of the preferential display object being overlapped by the predetermined object translucent.

3. The computer-readable storage medium having stored therein the information processing program according to claim 2, wherein the preferential display object includes a first object and a second object which is translucent, and the stereoscopically visible image rendering renders the first object according to the preference order by which the predetermined object is preferentially rendered and renders the second object according to the preference order by which the preferential display object is preferentially rendered.

4. The computer-readable storage medium having stored therein the information processing program according to claim 1, wherein the information processing program further causes the computer to provide functionality comprising a input receipt for receiving an input from a user, and the preferential display object placement causes the preferential display object placed in the virtual three-dimensional space to move based on the input received by the input receipt.

5. The information processing program according to claim 1, the program further causes the computer to provide functionality comprising a user object placement means for moving a user object.

6. The computer-readable storage medium having stored therein the information processing program according to claim 1, wherein the preferential display object is an indication object for indicating a position in the virtual three-dimensional space.

7. An information processing apparatus for displaying a virtual three-dimensional space taken by a virtual stereo camera, on a display apparatus capable of stereoscopic display, the information processing apparatus comprising:

a processing system, including a computer processor, the processing system being at least configured to:

place means for placing a preferential display object in an imaging range of the virtual stereo camera in the virtual three-dimensional space;

take the virtual three-dimensional space using the virtual stereo camera, and render a stereoscopically visible image of the virtual three-dimensional space; and cause the display apparatus to display the rendered stereoscopically visible image; wherein the preferential display object is rendered in preference to a predetermined object that is positioned in front of the preferential display object, such that a portion of the preferential display object being overlapped by the predetermined object is translucent.

8. An information processing system for displaying a virtual three-dimensional space taken by a virtual stereo camera, on a display apparatus capable of stereoscopic display, the information processing system comprising:

a preferential display object placer configured to place a preferential display object in an imaging range of the virtual stereo camera in the virtual three-dimensional space;

a stereoscopically visible image renderer configured to take the virtual three-dimensional space using the virtual stereo camera, and render a stereoscopically visible image of the virtual three-dimensional space; and a display controller configured to cause the display apparatus to display the stereoscopically visible image rendered by the stereoscopically visible image renderer; wherein the stereoscopically visible image renderer is configured to render the preferential display object in preference to a predetermined object that is positioned in front of the preferential display object, such that a portion of the preferential display object being overlapped by the predetermined object is translucent.

9. An information processing method for displaying a virtual three-dimensional space taken by a virtual stereo camera, on a display apparatus capable of stereoscopic display, the information processing method comprising:

a preferential display object placing step of placing a preferential display object in an imaging range of the virtual stereo camera in the virtual three-dimensional space;

a stereoscopically visible image rendering step of taking the virtual three-dimensional space using the virtual stereo camera, and rendering a stereoscopically visible image of the virtual three-dimensional space; and a display control step of displaying, on the display apparatus, the stereoscopically visible image rendered in the stereoscopically visible image rendering step; wherein in the stereoscopically visible image rendering step, the preferential display object is rendered in preference to a predetermined object that is positioned in front of the preferential display object, such that a portion of the preferential display object being overlapped by the predetermined object is translucent.

* * * * *